Patented Nov. 22, 1938

2,137,279

UNITED STATES PATENT OFFICE 2,137,279

PROCESS FOR THE MANUFACTURE OF PHTHALIC DI-DIETHYLAMIDE

Felix Haffner, Tubingen, and Fritz Sommer, Berlin, Germany, assignors to the firm Chemische Fabrik Grünau, Landshoff & Meyer, A. G., Berlin-Grunau, Germany, a company of Germany No Drawing. Original application February 7, 1935, Serial No. 5,494, now Patent No. 2,057,145, dated October 13, 1936. Divided and this application September 9, 1936, Serial No. 99,956 In Germany February 9, 1934

8 Claims. (Cl. 260—558)

This is a divisional application of our application Ser. No. 5,494 filed on February 7th 1935, issued as Patent No. 2,057,145, on Oct. 13, 1936, for improvements in and relating to a pharmaceutical preparation for stimulating the respiratory centre and increasing the circulation.

The present invention relates to the process for the manufacture of phthalic di-diethylamide, which is especially adapted to the use as a pharmaceutical preparation for stimulating the respiratory centre and increasing the circulation.

According to "Annales de Chimie" 1928, vol. 9, pages 59-60 and 64-65, it has been known to produce o-phthalic di-dimethylamide by reacting phthalyldichloride with diethylamine in anhydrous benzene. Such a process, however, is not adapted to produce larger quantities of o-phthalic di-diethylamide and has the disadvantage of employing the very inflammable and expensive solvent benzene.

The main object of our invention is to provide a process by means of which o-phthalic di-diethylamide may be manufactured in a simple manner and in large quantities.

In order to carry out our invention into practice the reaction of a halide of phthalic acid with diethylamine is caused in an aqueous solution, and the phthalic di-diethylamide thus formed is salted out by saturating the solution with common salt. The crude product thus obtained may be purified by re-dissolving it in water, filtering the aqueous solution through active charcoal and salting out the o-phthalic di-diethylamide again by saturation with common salt. A complete purification may then be effected by a subsequent vacuum distillation.

Our process has the advantage of the elimination of a very easily inflammable solvent. Furthermore, it has been found, that the reaction of a halide of phthalic acid with diethylamine, a so-called Schotten-Baumann-reaction, provides a considerable yield also in an aqueous solution, this being a feature, which could not at all be foreseen. Another advantage of our invention consists therein, that 2 mols of diethylamine are sufficient, if the reaction takes place in the presence of a quantity of alkali or alkali carbonate equivalent to 2 mols of diethylamine, while the hitherto known process employing a benzene solution requires 4 mols of diethylamine.

The invention will be illustrated by the following example:

Example 1.6 kilograms of diethylamine (98%) are dissolved in 3.2 kilograms of water. 1 kilogram of phthalyl dichloride is slowly introduced into this solution while stirring, the temperature being maintained at about 15° C. The o-phthalic di-diethylamide thus formed is salted out by saturating the aqueous solution with common salt. The oil separating on the surface is removed. Preferably the oily crude product is purified by dissolving it in about 6 litres of water, filtering the solution with the addition of 200 grams of active charcoal and salting out the reaction product again from the filtrate. Then a complete purification of the oily reaction product thus purified is carried out by a subsequent distillation in vacuo, to which it is subjected. In the vacuum distillation under a pressure of 5 mm. of mercury, a distillate passing over between 175° and 180° C. is obtained, which at first forms an almost colorless liquid and which later on solidifies to large crystals of a melting point of about 39° C. The crystals are readily soluble in water.

If desired, half of the specified quantity of diethylamine may be taken, if instead thereof the equivalent quantity of alkali or alkali carbonate is added for binding the hydrochloric acid of the aqueous solution. If, for example, .525 kilogram of calcined soda is added to the aqueous solution, .8 kilogram of diethylamine may be used instead of 1.6 kilograms as stated above.

We have shown a preferred embodiment of our invention, but it is clear, that numerous changes may be made without departing from the spirit of our invention.

What we claim is:

1. A process for the manufacture of phthalic di-diethylamide comprising the steps of reacting phthalyl dichloride with diethylamine in an aqueous solution, and salting out the phthalic di-diethylamide thus formed by saturating the solution with common salt.

2. A process for the manufacture of phthalic di-diethylamide comprising the steps of reacting 1 mol of a halide of phthalic acid with 4 mols of diethylamine in an aqueous solution, and salting out the phthalic di-diethylamide thus formed by saturating the solution with common salt.

3. A process for the manufacture of phthalic di-diethylamide comprising the steps of reacting 1 mol of phthalyl dichloride with 4 mols of diethylamine in an aqueous solution, and salting out the phthalic di-diethylamide thus formed by saturating the solution with common salt.

4. A process for the manufacture of phthalic di-diethylamide comprising the steps of reacting 1 mol of a halide of phthalic acid with 2 mols of diethylamine in an aqueous solution in the presence of 2 equivalents of a compound having an alkaline effect, and salting out the phthalic di-diethylamide thus formed by saturating the solution with common salt.

5. A process for the manufacture of phthalic di-diethylamide comprising the steps of reacting 1 mol of phthalyl dichloride with 2 mols of diethylamine in an aqueous solution in the presence of 2 equivalents of a compound having an alkaline effect, and salting out the phthalic di-diethylamide thus formed by saturating the solution with common salt.

6. A process for the manufacture of phthalic di-diethylamide comprising the steps of reacting a halide of phthalic acid with diethylamine in an aqueous solution, salting out the phthalic di-diethylamide thus formed by saturating the solution with common salt, re-dissolving the thus obtained crude product in water, filtering the solution thus obtained through active charcoal, salting out the reaction product again from the filtrate, and distilling the thus formed reaction product in vacuo.

7. A process for the manufacture of phthalic di-diethylamide comprising the steps of reacting phthalyl dichloride with diethylamine in an aqueous solution, salting out the phthalic di-diethylamide thus formed by saturating the solution with common salt, re-dissolving the thus obtained crude product in water, filtering the solution thus obtained through active charcoal, salting out the reaction product again from the filtrate, and distilling the thus formed reaction product in vacuo.

8. A process for the manufacture of phthalic di-diethylamide comprising the steps of reacting 1 mol of phthalyl chloride with 2 mols of diethylamine in an aqueous solution in the presence of 2 equivalents of a compound having an alkaline effect, salting out the phthalic di-diethylamide thus formed by saturating the solution with common salt, re-dissolving the thus obtained crude product in water, filtering the solution thus obtained through active charcoal, salting out the reaction product again from the filtrate, and distilling the thus formed reaction product in vacuo.

FRITZ SOMMER.
FELIX HAFFNER.